United States Patent [19]

Migdal

[11] Patent Number: 5,436,509
[45] Date of Patent: Jul. 25, 1995

[54] ELECTRICAL POWER SUPPLY FOR MOTOR VEHICLES

[75] Inventor: Victor Migdal, Herzlia, Israel

[73] Assignee: Energator Technologies Ltd., Herzlia, Israel

[21] Appl. No.: 697,217

[22] Filed: May 7, 1991

[51] Int. Cl.$^6$ .......................... H02J 7/14; H02J 1/00
[52] U.S. Cl. ..................... 307/9.1; 307/10.1; 307/17; 322/90
[58] Field of Search ............ 307/9.1, 10.1, 10.7, 307/17; 219/202, 203, 133; 322/8, 90, 93

[56] References Cited

U.S. PATENT DOCUMENTS

| | | | |
|---|---|---|---|
| 3,316,416 | 4/1967 | Carlson | 307/17 |
| 3,586,868 | 6/1971 | Martens et al. | 307/10.1 |
| 3,660,671 | 5/1972 | Peterson | 290/1 |
| 3,668,514 | 6/1972 | Peck | 322/28 |
| 3,676,694 | 7/1972 | Schneider et al. | 307/10.1 |
| 3,770,976 | 11/1973 | Stroud et al. | 307/10.1 |
| 3,894,242 | 7/1975 | Helling | 307/10.1 |
| 3,899,652 | 8/1975 | Terry et al. | 219/133 |
| 4,100,474 | 7/1978 | Pfeffer et al. | 320/17 |
| 4,239,978 | 12/1980 | Kofink | 307/16 |
| 4,330,715 | 5/1982 | Stroud et al. | 307/10.1 |
| 4,599,687 | 7/1986 | Smith | 363/61 |
| 4,692,684 | 9/1987 | Schaeffer | 322/90 |
| 4,705,934 | 11/1987 | Winkler | 219/137 PS |
| 4,808,842 | 2/1989 | Hughes | 307/43 |
| 4,853,557 | 8/1989 | Meier et al. | 307/10.1 |
| 4,868,480 | 9/1989 | van der Linde | 322/7 |
| 4,884,018 | 11/1989 | Meuret et al. | 322/8 |
| 4,973,896 | 11/1990 | Shiga et al. | 322/28 |

Primary Examiner—Brian K. Young
Assistant Examiner—Fritz M. Fleming
Attorney, Agent, or Firm—Cowan, Liebowitz & Latman

[57] ABSTRACT

An electrical power supply for motor vehicles including an alternator arranged to receive a rotational driving input from a vehicle engine and control and switching means operative to automatically switch from operation in an alternator mode of operation to operation in a generator mode of operation in response to disconnection of the alternator from a vehicle battery.

7 Claims, 3 Drawing Sheets

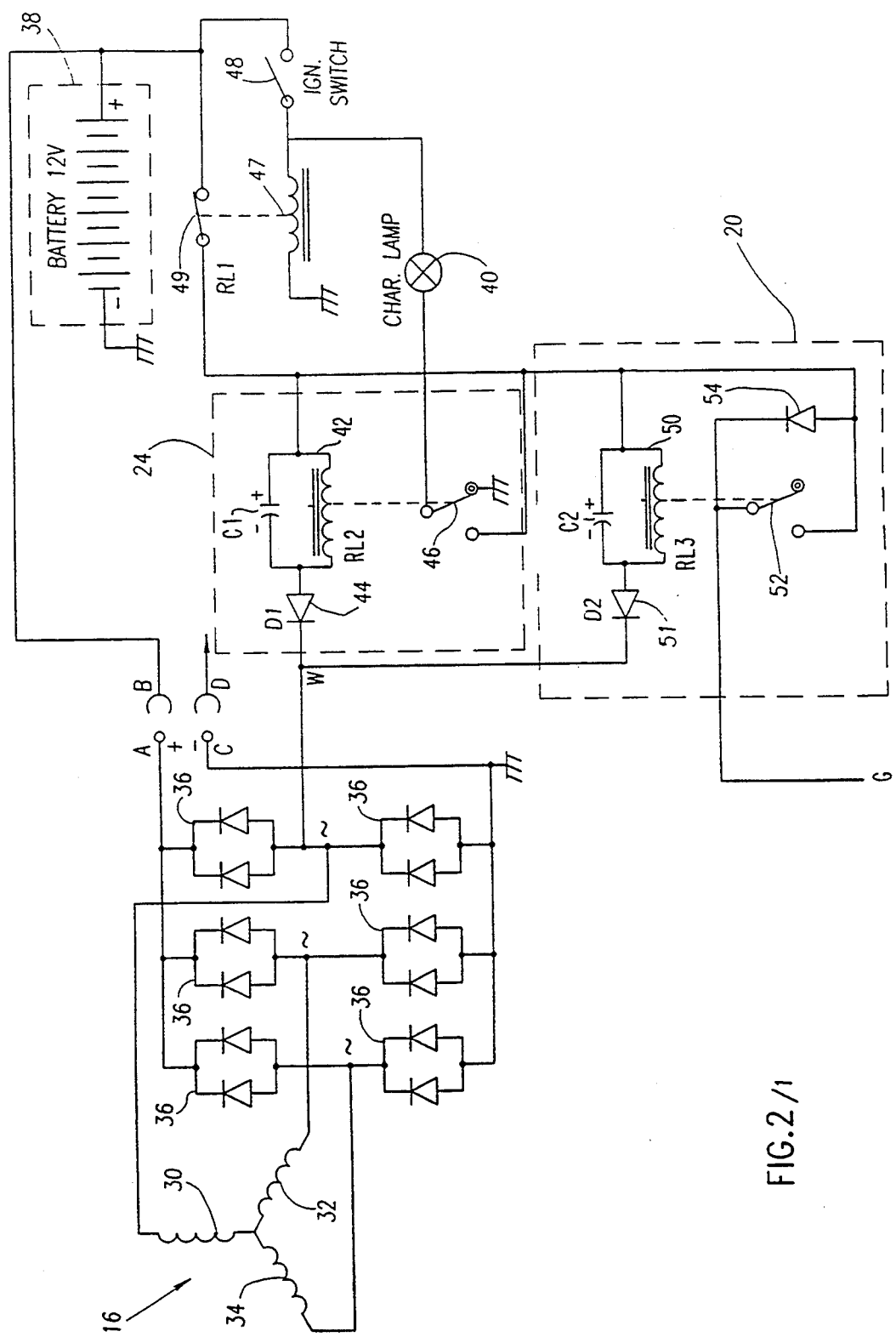
FIG.2/1

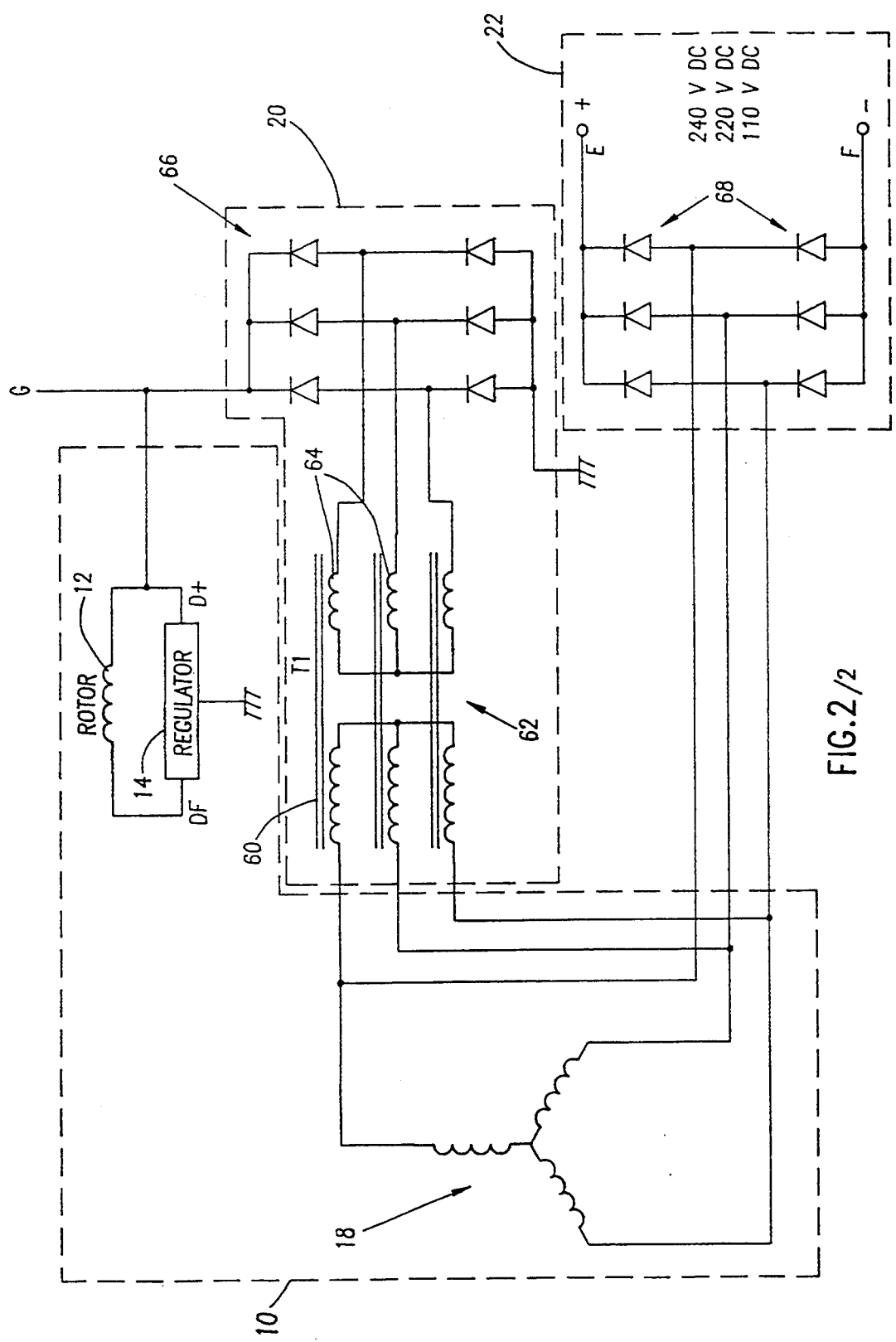
FIG.2/2

ELECTRICAL POWER SUPPLY FOR MOTOR VEHICLES

FIELD OF THE INVENTION

The present invention relates to DC power supplies generally and more particularly to power supplies suitable for retrofit in place of a conventional vehicle alternator.

BACKGROUND OF THE INVENTION

There exist a wide variety of DC power supplies useful in association with vehicles. Examples of such devices are described in the following U.S. Pat. Nos. 4,853,557; 4,599,687; 3,316,416; 4,330,715; 4,705,934; 3,899,652; 3,894,242; 4,100,474 and 3,770,976.

SUMMARY OF THE INVENTION

The present invention seeks to provide an improved electrical power supply for motor vehicles.

There is thus provided in accordance with a preferred embodiment of the present invention an improved electrical power supply for motor vehicles including an alternator arranged to receive a rotational driving input from a vehicle engine and control and switching apparatus operative to automatically switch from operation in an alternator mode of operation to operation in a generator mode of operation in response to disconnection of the alternator from a vehicle battery.

Additionally in accordance with a preferred embodiment of the present invention there is provided an improved electrical power supply for motor vehicles including an alternator arranged to receive a rotational driving input from a vehicle engine and control and switching apparatus operative in association with the alternator to provide a floating mains voltage output.

In accordance with a preferred embodiment of the invention, the control and switching apparatus comprises only passive components.

Further in accordance with a preferred embodiment of the present invention there is provided an improved electrical power supply for motor vehicles including an alternator arranged to receive a rotational driving input from a vehicle engine and control and switching apparatus operative in association with the alternator and including apparatus for providing a welding output and including a plurality of diodes arranged in parallel pairs.

Further in accordance with a preferred embodiment of the present invention there is provided an improved electrical power supply for motor vehicles including an alternator arranged to receive a rotational driving input from a vehicle engine and control and switching apparatus operative in association with the alternator and a driver warning light to indicate to a vehicle operator when the alternator is disconnected from the vehicle battery.

Additionally in accordance with a preferred embodiment of the present invention there is provided an improved electrical power supply for motor vehicles including an alternator arranged to receive a rotational driving input from a vehicle engine and control and switching apparatus operative in association with the alternator, the alternator and the control and switching apparatus including separate means for providing line voltage outputs and means for providing low voltage, high amperage outputs for welding or battery charging, the separate means being operable at the same time to permit welding and provision of line voltage outputs.

BRIEF DESCRIPTION OF THE DRAWINGS

The present invention will be understood and appreciated more fully from the following detailed description, taken in conjunction with the drawings in which:

FIGS. 2/1 and 2/2 together are a detailed schematic illustration of the power supply of FIG. 1.

DETAILED DESCRIPTION OF A PREFERRED EMBODIMENT

Figure 1:
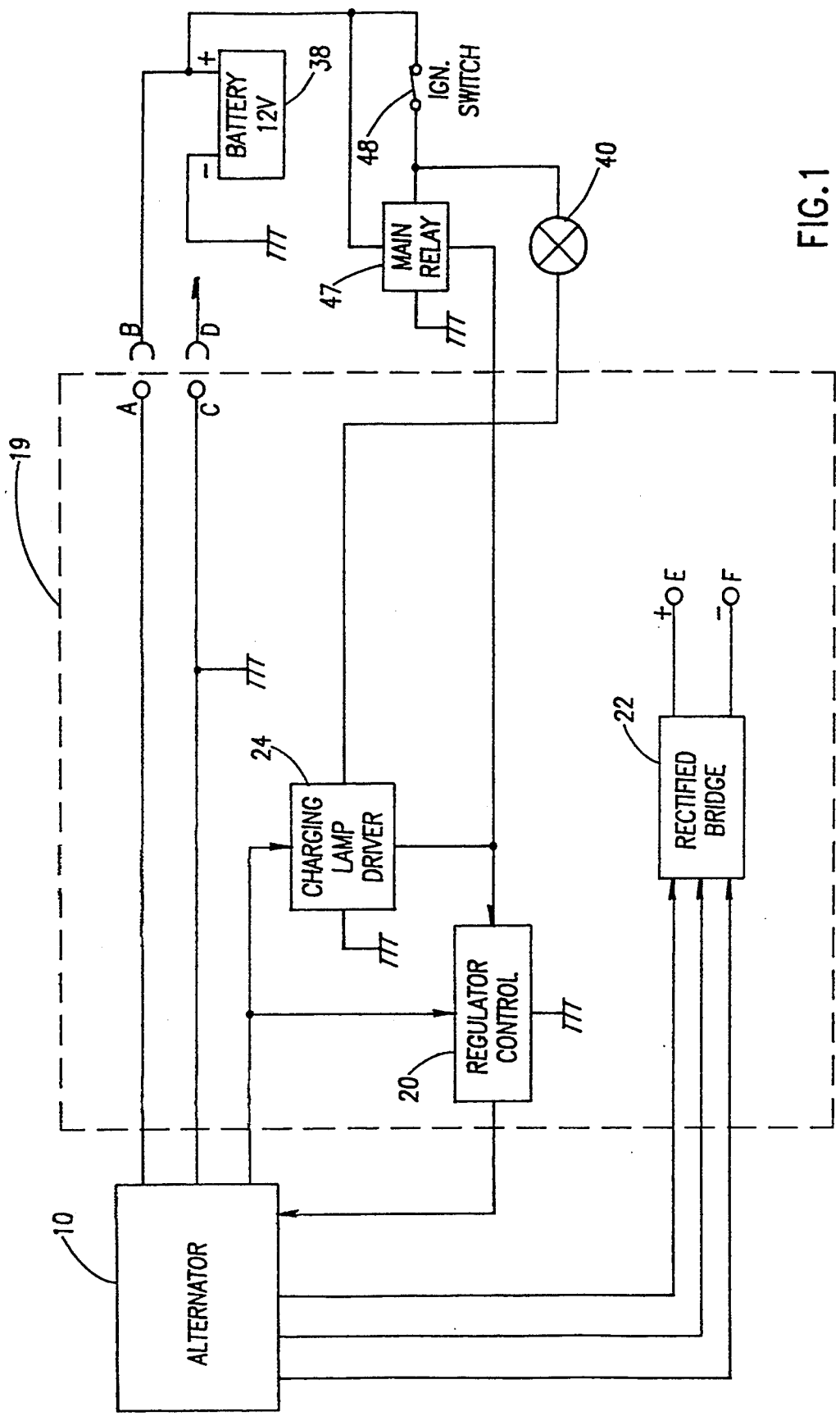
FIG. 1 is a generalized block diagram illustration of a power supply constructed and operative in accordance with a preferred embodiment of the present invention.

Reference is now made to FIGS. 1, 2/1 and 2/2, which illustrate a power supply constructed and operative in accordance with a preferred embodiment of the present invention. Generally speaking, the power supply comprises an alternator 10, having a single rotor 12 and associated regulator 14, such as an 90 Amp. alternator commercially available from Bosch of Germany, which is modified as indicated in FIGS. 2/1 and 2/2, and as described hereinbelow.

As seen in FIGS. 2/1 and 2/2, the single stator coil of the conventional alternator is replaced by a pair of stator coils 16 and 18 wound on the original core, both of which are inductively driven by rotor 12. The two stator coils 16 and 18 are separated and inductively and electrically insulated from each other, such that the output of stator coil 18 "floats" independently of the output of the vehicle battery and chassis or other fixed voltage source. The outputs of the stator coil 18 are rectified by diodes 68. The DC voltage produced is independent of the vehicle battery voltage and is in no way referenced to chassis or battery ground. Therefore, the DC voltage output at terminals E and F is a floating main DC voltage output.

Associated with alternator 10 and disposed in a regulator and junction box 19 is regulator control circuitry 20 and rectifier bridge circuitry 22, as well as charging indication lamp driver circuitry 24.

As seen in FIG. 2/1, in accordance with a preferred embodiment of the present invention, each of the three windings 30, 32 and 34 of stator 16 is coupled to a pair of pairs of diodes 36, which are coupled together to provide respective plus and minus DC outputs at respective positive and negative socket terminals A and C respectively. Socket terminals A and C are employed for welding and battery charging. Normally the vehicle battery 38 is coupled to terminal A by means of a quick coupling connector B, such as connector elements available under catalog numbers BN 511.01.003 and BN 511.0006 of Alexander Binzel of Germany.

In accordance with a preferred embodiment of the present invention, when the vehicle battery 38 is decoupled from terminal A, charging indication lamp driver circuitry 24 is operative to cause illumination of a lamp 40 indicating that battery 38 is not being charged. When the positive terminal of battery 38 is connected to terminal A, the lamp 40 is no longer illuminated.

Circuitry 24 comprises a relay 42, which receives an AC input from coil 30 of stator 16 via a diode 44 when battery 38 is coupled to terminal A. This relay, in the absence of the AC input, i.e. when the battery 38 is not coupled to terminal A, and when the vehicle engine is operating, driving the alternator, positions a switch 46, as shown in FIG. 2/1 to couple one side of lamp 40 to ground. In this case, when the vehicle ignition switch 48 is closed, causing a relay 47 to close a switch 49, providing battery voltage to the other side of lamp 40. the lamp is illuminated, warning the operator that the battery 38 is not coupled.

Regulator control circuitry 20 includes a relay 50 which also receives an input from coil 30 of stator 16 via a diode 51 and is operative to control the position of a switch 52, such that when battery 38 is decoupled from terminal A, switch 52 is open, as illustrated in FIG. 2/1, thus coupling the voltage of battery 38 to the regulator 14 only via a diode 54, such that the output of stator coils 18 cannot charge the battery 38. Node G in FIG. 2/1 shows switch 52 and diode 54 connected to the rotor 12 and regulator 14 in FIG. 2/2.

Turning now to FIG. 2/2 it is seen that the stator coils 18 are each coupled to a primary 60 of a transformer 62, forming part of regulator control circuitry 20. The corresponding secondaries 64 are coupled via a diode bridge 66 to regulator 14, in order to provide a voltage feedback input to the regulator 14, when the vehicle battery is disconnected from terminal A. This mode of operation is termed the "generator" mode of operation. During the generator mode of operation, transformer 62 is operative in association with diode bridge 66 to provide a maintenance current to the rotor 12, thereby eliminating a drain on the vehicle battery 38. Normally, when the power supply is operative in the generator mode, it is necessary to increase the engine revolutions. This may be achieved by any suitable mechanical or electrical apparatus.

When the vehicle battery 38 is coupled to terminal A, its voltage governs the operation of the regulator 14 as in ordinary alternators. This mode of operation is termed the "alternator" mode of operation. In the "alternator" mode of operation, line voltage outputs are not provided at terminals E and F.

The stator coils 18 are each connected via suitable diodes 68 to output terminals E and F, which are employed to provide DC line voltages. Both the stator coils 18 and the primaries 60 are selected to match the desired output voltage at terminals E and F, for example any one of 110 V, 220 V or 240 V DC.

It will be appreciated by persons skilled in the art that the present invention is not limited by what has been particularly shown and described hereinabove. Rather the scope of the invention is defined only by the claims which follow.

I claim:

1. A motor vehicle accessory DC electrical power supply comprising:
    alternator means connected to a source of mechanical energy for convening mechanical energy supplied by said source of mechanical energy into electrical energy;
    first rectification means responsive to said alternator means for supplying a low voltage high current DC output referenced to electrical ground;
    switching means for automatically convening said electrical power supply from operation in a vehicle charging mode of operation to operation in a vehicle generator mode of operation in response to disconnection of said alternator means from a vehicle battery;
    second rectification means responsive to said alternator means for supplying a floating main DC voltage output not referenced to electrical ground; said electrical power supply able to provide said low voltage high current DC output and said floating main DC voltage output simultaneously; and
    regulator means responsive to said alternator means for providing a maintenance current to said alternator means comprising relay means, transformer means and third rectification means; said relay means responsive to disconnection of said alternator from said vehicle battery for coupling said vehicle battery to said regulator means whereby said alternator cannot charge said vehicle battery; said transformer means responsive to said alternator means for producing a maintenance current to control said alternator means; said third rectifier means responsive to said transformer means for producing a rectified voltage feedback signal to control said alternator means.

2. A motor vehicle accessory DC electrical power supply according to claim 1 wherein said first rectification means further comprises a plurality of diodes arranged in parallel pairs.

3. An electrical power supply according to claim 1 and also comprising a driver warning light to indicate to a vehicle operator when the alternator is disconnected from a vehicle battery.

4. A motor vehicle accessory DC electrical power supply comprising:
    alternator means driven by a rotational driving force from an engine for converting rotational energy supplied by said rotational driving force into electrical energy;
    first rectification means responsive to said alternator means for supplying a low voltage high current DC output referenced to electrical ground;
    switching means for automatically convening said electrical power supply from operating in a vehicle charging mode of operation to operation in a vehicle generator mode of operation in response to disconnection of said alternator means from a vehicle battery;
    second rectification means responsive to said alternator means for supplying a floating main DC voltage output not referenced to electrical ground; said electrical power supply able to provide said low voltage high current DC output and said floating main DC voltage output simultaneously;
    regulator means responsive to said alternator means for providing a maintenance current to said alternator means comprising relay means, transformer means and third rectification means; said relay means responsive to disconnection of said alternator from said vehicle battery for coupling said vehicle battery to said regulator means whereby said alternator cannot charge said vehicle battery; said transformer means responsive to said alternator means for producing a maintenance current to control said alternator means; said third rectifier means responsive to said transformer means for producing a rectified voltage feedback signal to control said alternator means; and
    charge indication means responsive to disconnection of said alternator from said vehicle battery to signal a user that said vehicle battery is not being charged.

5. A motor vehicle accessory DC electrical power supply according to claim 2 wherein said first rectification means further comprises a plurality of diodes arranged in parallel pairs.

6. A motor vehicle accessory DC electrical power supply comprising:
- alternator means driven by a rotational driving force from an engine for converting rotational energy supplied by said rotational driving force into electrical energy;
- first rectification means responsive to said alternator means for supplying a low voltage high current DC output referenced to electrical ground;
- switching means for automatically converting said electrical power supply from operating in a vehicle charging mode of operation to operation in a vehicle generator mode of operation in response to disconnection of said alternator means from a vehicle battery;
- second rectification means responsive to said alternator means for supplying a floating main DC voltage output not referenced to electrical ground; said electrical power supply able to provide said low voltage high current DC output and said floating main DC voltage output simultaneously; and
- regulator means comprising relay means, transformer means and third rectification means; said relay means responsive to said disconnection of said alternator from said vehicle battery for coupling said vehicle battery to regulator means whereby said alternator cannot charge said vehicle battery; said transformer means responsive to said alternator means for producing a maintenance current to control said alternator means; said third rectifier means responsive to said transformer means for producing a rectified voltage feedback signal to control said alternator means.

7. A motor vehicle accessory DC electrical power supply comprising:
- alternator means comprising first stator means, second stator means and rotor means; said first stator means for converting rotational energy supplied by a rotational driving force from an engine into electrical energy subsequently used to produce a low voltage high current DC output referenced to electrical ground; said second stator means for converting rotational energy supplied by said rotational driving force from said engine into electrical energy subsequently used to produce a floating main DC voltage output not referenced to said electrical ground; said rotor means able to receive rotational energy supplied by said rotational driving force from said engine for converting rotational energy into electrical energy; said first and second stator means being wound on the same core, inductively driven by said rotor and inductively and electrically insulated from each other;
- first rectification means responsive to said first stator means for supplying said low voltage, high amperage DC output referenced to electrical ground;
- switching means for automatically converting said electrical power supply from operating in a vehicle charging mode of operation to operation in a vehicle generator mode of operation in response to disconnection of said alternator means from a vehicle battery;
- second rectification means responsive to said second stator means for supplying said floating main DC voltage output not referenced to electrical ground; said electrical power supply able to provide said low voltage high current DC output and said floating main DC voltage output simultaneously; and
- regulator means comprising relay means, transformer means and third rectification means; said relay means responsive to disconnection of said alternator from said vehicle battery for coupling said vehicle battery to said regulator means whereby said alternator cannot charge said vehicle battery; said transformer means responsive to said alternator means for producing a maintenance current to control said alternator means; said third rectifier means responsive to said transformer means for producing a rectified voltage feedback signal to control said alternator means.

* * * * *